(No Model.) 2 Sheets—Sheet 1.

J. O. SHAW.
CRANBERRY GATHERING MACHINE.

No. 389,114. Patented Sept. 4, 1888.

WITNESSES.
Frances M. Brown.
Marion E. Brown.

INVENTOR.
John O. Shaw,
by his Attorneys,
Brown Bros.

(No Model.) 2 Sheets—Sheet 2.

J. O. SHAW.
CRANBERRY GATHERING MACHINE.

No. 389,114. Patented Sept. 4, 1888.

WITNESSES.
Francis M. Brown,
Marion E. Brown

INVENTOR.
John O. Shaw by his
Attorneys Brown Bros.

UNITED STATES PATENT OFFICE.

JOHN O. SHAW, OF BOSTON, MASSACHUSETTS.

CRANBERRY-GATHERING MACHINE.

SPECIFICATION forming part of Letters Patent No. 389,114, dated September 4, 1888.

Application filed February 6, 1888. Serial No. 263,191. (No model.)

*To all whom it may concern:*

Be it known that I, JOHN O. SHAW, of Boston, in the county of Suffolk and State of Massachusetts, have invented certain new and useful Improvements in Machines for Gathering Cranberries, of which the following is a full, clear, and exact description.

This improved cranberry-gatherer is composed of a stationary receptacle for the cranberries and a raking or gathering device arranged to rotate about said receptacle and suitably constructed to rake and gather the cranberries from their vines and to deliver them into said receptacle, in combination with a cylindrical casing or shell which surrounds said raking device and is arranged to rotate concentrically therewith, but preferably in an opposite direction, and is constructed with slotted openings or ways for the entrance of the vines and their berries and their presentation to the raking device, and at the same time to act as a guard or protector to the vines to prevent their being uprooted or practically injured from the action thereon of the raking device, all substantially as hereinafter described.

In addition to the above, the improved cranberry-gatherer embraces other features of construction, as will hereinafter fully appear.

Figure 2:
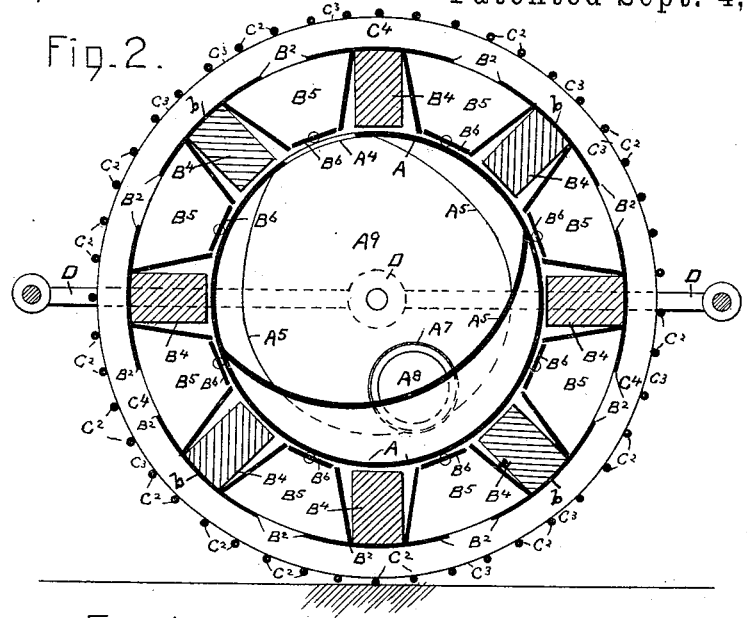
Figure 1:
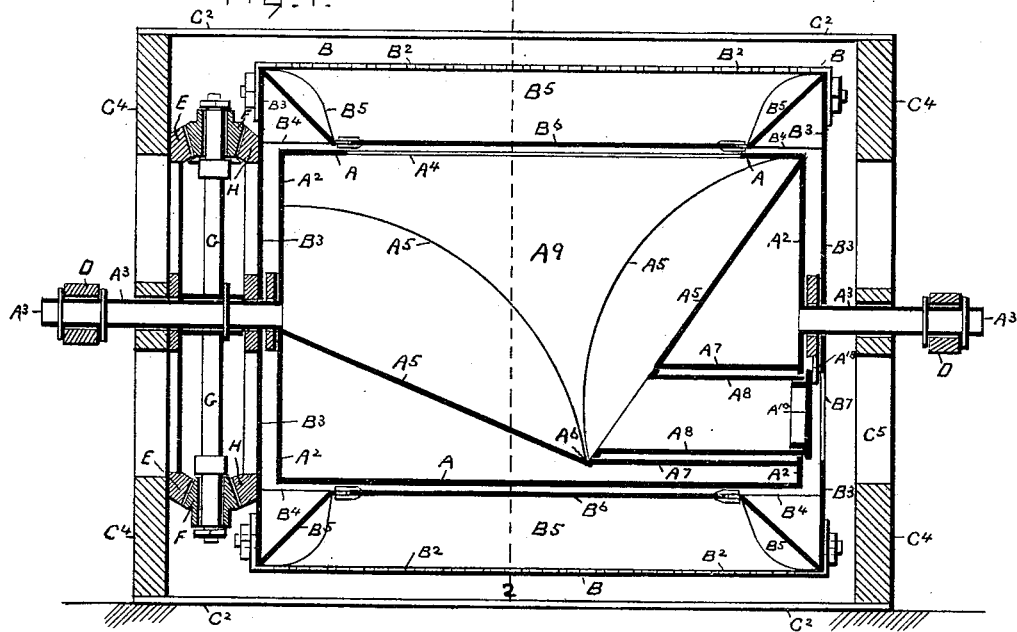
Figure 3:
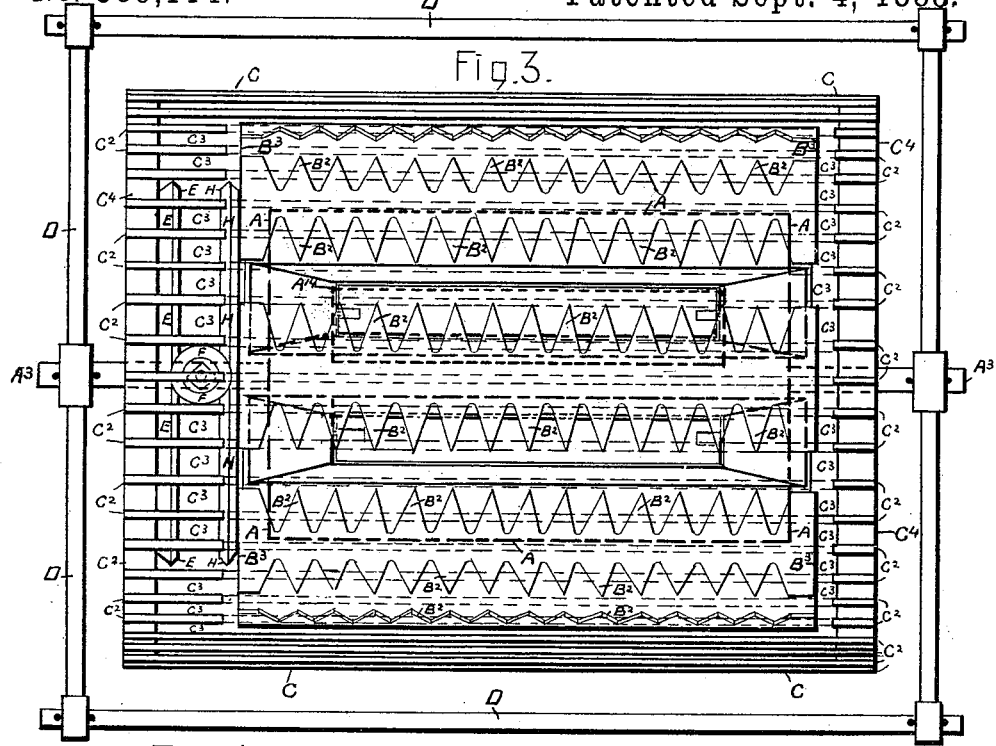
Figure 4:
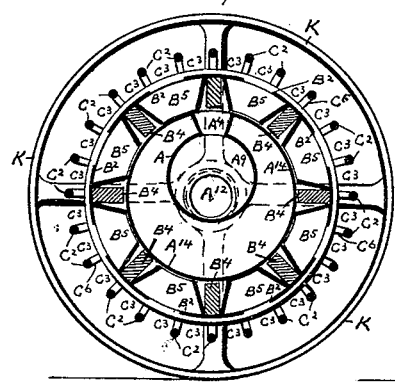
Figure 5:
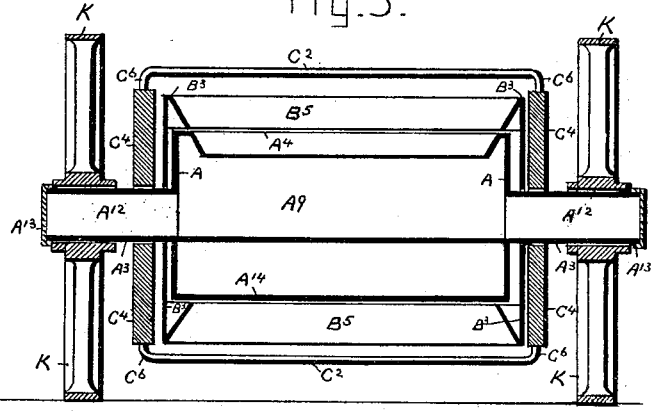

In the drawings of the improved cranberry-gatherer of this invention, and forming part of this specification, Figure 1 is a central longitudinal vertical section. Fig. 2 is a transverse vertical section, line 2 2, Fig. 1. Fig. 3 is a plan view, but with portions broken out and shown in dotted lines, as will hereinafter appear. Fig. 4 is a transverse vertical section, and Fig. 5 is a central longitudinal section, illustrations in detail of modifications in construction, all as will hereinafter appear.

In the drawings, A is the receptacle for the cranberries as raked up or gathered. B is the device for raking or gathering the cranberries, and C is the cylindrical shell or casing to guard and protect the vines against being uprooted or practically injured by the raking or gathering device B.

The cranberry-receptacle A, as shown, is cylindrical. Its ends or heads $A^2$ have projecting and fixed concentric journals or axles $A^3$. Its upper side has a slotted opening, $A^4$, and interiorly it is constructed with sides $A^5$, downwardly inclining and meeting at an angle, $A^6$, at or near which is a discharge passage or chute, $A^7$, leading through one of the heads $A^2$ and provided with a telescoping section, $A^8$, by which, when drawn out, to extend the chute to the outside and beyond said head, and thus the cranberries received within the chamber $A^9$, formed by said inclining sides $A^5$, can be the more conveniently delivered to the outside of the receptacle. $A^{10}$ is an attachable and detachable cap closing the outer end of the telescoping section $A^8$.

The cranberry raking or gathering device B consists of a series of blades or plates, $b$, each provided with raking-teeth $B^2$, of any suitable construction, extending along its opposite edges and severally arranged at equal distances from each other and in lines parallel and about at equal distances from the longitudinal axis of and outside of and about the cranberry-receptacle A. These toothed plates are supported and carried by opposite end or head plates, $B^3$, joined by longitudinal bars $B^4$, to which the rake-blades are secured, and all is arranged to turn loosely or to rotate on the journals or axles $A^3$ of the cranberry-receptacle A.

$B^5$ are a series of hoppers or troughs having inclining sides and ends, and located between and inside of and extending beyond each side of the rake blades or plates. Each trough $B^5$ has its bottom $B^6$ journaled at its opposite ends and in position to bear upon the outside of the berry-receptacle A, and so thereby to be kept closed, but free to tilt, and thus to open when opposite to the slotted opening $A^4$ of the berry-receptacle. These troughs or hoppers receive and retain the berries raked or gathered by the raking device B until entered into the receptacle A by the opening of their tilting bottoms, as stated. The raking device B rotates about the cranberry-receptacle A, which is stationary.

The shell or casing C, to guard or protect the vines, surrounds the raking device B, and it is composed of head or end plates, $C^1$, suspended to rotate upon axles $A^3$ of the berry-receptacle A, and of rods or bars $C^2$, which join the heads $C^1$ and are placed apart so as to have openings or spaces $C^3$ between them.

D is a rectangular-shaped frame entirely surrounding the slotted shell C and suspended at its opposite ends upon the journals of the cranberry-receptacle. The shell C is rolled over the surface of the ground by pushing against or pulling upon its frame D, and so rolled it turns on the journals of the cranberry-receptacle A. The shell C has a crown gear-wheel, E, secured to the inside of one of its heads, which meshes with loose pinion-wheels F at the opposite ends of a common radial shaft, G, suspended loosely on one end journal of the cranberry-receptacle, and in turn meshing a concentric crown gear-wheel, H, of one head of the raking device B, the whole so as to secure a rotation of the raking device from the rolling or rotation of the shell C, as stated, but in an opposite direction, the cranberry-receptacle remaining stationary, excepting that it is carried along with said shell as it is rolled over the ground. In the rolling of the shell C over the ground the vines and berries enter into it through its spaces $C^3$, and thus they are presented to the raking device B, which, rotating, removes the berries from the vines and drops them into the troughs or hoppers $B^5$, by which they are carried up and around and finally discharged through the slotted opening $A^4$ of the cranberry-receptacle into its receiving-chamber $A^9$, to be afterward removed at its discharging chute or spout $A^7$.

The shell C guards and protects the vines from being uprooted or practically injured by the operation of the raking device B thereon, while allowing the vines and berries to be presented to the action of the raking device.

To discharge the berries from the berry-receptacle A, the machine being at rest, the telescoping section of the chute is first drawn out through openings suitably located therefor at the corresponding head of the raking device and shell.

$B^7$ is the opening in the head of the raking device B, and $C^5$ is the opening in the head of shell C.

The machine described may be rolled in either direction over the ground, and the shell C and the raking device B may be geared for the latter to rotate in the same direction as the former, instead of in an opposite direction, as particularly described and explained. Again, Fig. 5, driving or traction wheels K, turning on or about the axles $A^3$ of the cranberry-receptacle A, may be used for transporting the apparatus from place to place when not required to operate. These wheels K are removed for the operation of the apparatus. Again, Figs. 4 and 5, a discharge-chute, $A^{12}$, for the berries in place of the discharge-chute $A^7$, before described, is shown as extending through the axles of the receptacle A, detachable caps $A^{13}$, Fig. 5, being applied to close them.

The bars $C^2$, Fig. 5, have bent ends $C^6$ attached to and projecting radially from the edge of the heads $C^4$, giving increased flexibility and elasticity to the bars in their rest upon the ground and cranberry-vines, the advantages of which are obvious without mention.

The bottoms of the berry-receiving troughs or hoppers of the raking device may be dispensed with, Fig. 4, in which case the berries would then rest on and move directly over the outside of the berry-receptacle as the raking device is rotated; but, as is obvious, it is preferable to use the bottoms described. Should, however, the bottoms be dispensed with, the sides and ends of the troughs should be extended, as in Fig. 4, to meet the convex surface of the berry-receptacle, so that the berries could not get between them and the receptacle, to be thus crushed, and with the dirt to foul or soil the receptacle and other parts of the machine. Figs. 4 and 5 illustrate the chamber $A^9$ of the berry-receptacle A as eccentric to the axis of rotation of raking device B and shell C, and, Figs. 4 and 5, the receptacle A is surrounded by a cylindrical casing, $A^{14}$, concentric with the axis of rotation of raking device B and shell C, to serve as the support for the bottoms $B^6$ of the trough.

The casing $A^{14}$ simply makes the berry-receptacle, and which interiorly is eccentric, all as just described, concentric as to its external periphery, as it were, to the axes of rotation of the raking device.

The machine, as described, is arranged for being rolled over the ground by hand; but obviously it can be readily adapted to be drawn by a horse or horses.

The discharge-chute of the berry-receptacle preferably is inclined outwardly and so as the better to discharge the berries, and its telescoping section may be provided with any suitable device to fasten it against accidental movement. It is preferable to construct the berry-receptacle interiorly with downwardly-inclining sides, as the berries are the better directed and delivered to the discharge-chute; but this construction is not essential or necessary.

Although the machine of this invention has been particularly described as a cranberry-gatherer, and for use as such it is not intended to limit its use in that regard, but to apply it to all analogous uses for which it may be found adapted.

Having thus described my invention, what I claim, and desire to secure by Letters Patent, is—

1. A rotating cylindrical shell or casing having openings or spaces in its length and a raking or gathering device of suitable construction rotating within said shell, and having a trough or troughs in its length, in combination with a stationary receptacle located within said raking device, and provided with an opening for the passage of the berries contained in the trough or troughs of the raking device into it, and otherwise with an opening through which to discharge the berries from it, substantially as described, for the purpose specified.

2. A rotating cylindrical shell or casing having openings or spaces in its length and a berry raking or gathering device rotating within said shell, and having a trough or troughs in its length with tilting bottoms, in combination with a stationary receptacle located within said raking device and provided with an opening for the passage of the berries contained in the trough or troughs of the raking device into it, and otherwise with an opening through which to discharge the berries from it, substantially as described, for the purpose specified.

3. A rotating cylindrical shell or casing having openings or spaces in its length, a berry raking or gathering device rotating within said shell, and having a trough or troughs in its length, and gearing connecting said shell and raking device to rotate the latter directly from the rotation of the former, in combination with a stationary receptacle located within said raking device and provided with an opening for the passage of the berries contained in the trough or troughs of the raking device into it, and otherwise with an opening through which to discharge the berries from it, substantially as described, for the purpose specified.

4. A rotating cylindrical shell or casing having openings or spaces in its length, a berry raking or gathering device rotating within said shell, and having a trough or troughs in its length with tilting bottoms, in combination with a stationary receptacle located within said raking device and constructed to support said tilting bottoms of the rake against tilting, and provided with an opening for the passage of the berries contained in the trough or troughs of the raking device into it, and otherwise with an opening through which to discharge the berries from it, substantially as described, for the purpose specified.

5. A rotating cylindrical shell or casing having openings or spaces in its length, a berry raking or gathering device rotating within said shell, and having a trough or troughs in its length, and gearing composed of concentric gear-wheels E H, respectively attached to said shell and said rake, and a swiveling pinion wheel or wheels, F, meshing both of said gear-wheels, and carried by an arm, G, suspended from and free to rotate about an axis concentric with the axis of rotation of said shell and rake, in combination with a stationary receptacle located within said raking device, and provided with an opening for the passage of the berries contained in the trough or troughs of the raking device into it, and otherwise with an opening through which to discharge the berries from it, substantially as described, for the purpose specified.

6. A rotating cylindrical shell or casing having openings or spaces in its length, a berry raking or gathering device rotating within said shell, and having a trough or troughs in its length, in combination with a stationary receptacle located within said raking device and provided with an opening for the passage of the berries from the trough or troughs of the raking device into it, and with a tubular passage, $A^{12}$, through which to discharge the berries from it, and which leads from it and is concentric with the axis of rotation of said shell and raking device, substantially as described, for the purpose specified.

In testimony whereof I have hereunto set my hand in the presence of two subscribing witnesses.

JOHN O. SHAW.

Witnesses:
ALBERT W. BROWN,
FRANCES M. BROWN.